US009491735B2

(12) United States Patent
Dorenbosch

(10) Patent No.: US 9,491,735 B2
(45) Date of Patent: Nov. 8, 2016

(54) SYSTEM AND METHOD IN A COMMUNICATION NETWORK OF DYNAMICALLY ASSIGNING A MULTIMEDIA BROADCAST/MULTICAST SERVICE BEARER TO A MULTICAST CHANNEL

(75) Inventor: Jheroen P. Dorenbosch, Paradise, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1385 days.

(21) Appl. No.: 12/972,489

(22) Filed: Dec. 19, 2010

(65) Prior Publication Data
US 2012/0155282 A1 Jun. 21, 2012

(51) Int. Cl.
*H04W 72/00* (2009.01)
*H04W 72/08* (2009.01)

(52) U.S. Cl.
CPC ......... *H04W 72/005* (2013.01); *H04W 72/087* (2013.01)

(58) Field of Classification Search
CPC .. H04B 7/0421; H04B 7/0615; H04B 17/00; H04L 1/0026; H04L 12/189; H04L 12/18; H04L 65/4076; H04L 47/14; H04L 65/00; H04W 72/087; H04W 72/005; H04W 72/042; H04W 72/1289; H04W 24/02; H04W 28/18; H04W 76/02; H04W 12/189; H04W 4/06; H04W 72/1273; H04W 72/02
USPC ....... 370/328, 329, 332, 343, 431, 437, 465, 370/468; 455/450, 452.1, 452.2
See application file for complete search history.

(56) References Cited

U.S. PATENT DOCUMENTS

| 7,177,658 | B2 * | 2/2007 | Willenegger et al. | ........ 455/522 |
| 7,580,718 | B2 * | 8/2009 | Mademann | .................... 455/458 |
| 7,738,375 | B1 * | 6/2010 | Vinokour et al. | ............ 370/232 |
| 7,889,689 | B2 * | 2/2011 | Sebire | ........................... 370/312 |
| 7,889,732 | B2 * | 2/2011 | Bijwaard et al. | ............. 370/390 |
| 2002/0080816 | A1 * | 6/2002 | Spinar et al. | ................. 370/449 |
| 2004/0087319 | A1 * | 5/2004 | Bos et al. | ..................... 455/458 |
| 2005/0243721 | A1 * | 11/2005 | Cai et al. | ...................... 370/230 |
| 2005/0255886 | A1 * | 11/2005 | Aaltonen et al. | ............ 455/558 |

(Continued)

FOREIGN PATENT DOCUMENTS

CN 101895820 * 11/2010
WO 2010/124411 * 4/2010

OTHER PUBLICATIONS

Huawei, "3GPP TSG-RAN WG3 Meeting #65"; Aug. 24-28, 2009, www.3gpp.org.*

(Continued)

*Primary Examiner* — Pao Sinkantarakorn
*Assistant Examiner* — Michael Phillips

(57) ABSTRACT

Methods for dynamically assigning a multimedia broadcast/multicast service (MBMS) bearer to a Multicast Channel (MCH) in a communication network include a logical server: receiving a MBMS configuration for the communication network; receiving a request for a MBMS bearer within a service area, wherein the request specifies a QoS requirement for the MBMS bearer; inspecting the MBMS configuration to determine if an existing MCH in the service area meets the QoS requirement for the MBMS bearer; based on the inspecting, assigning the MBMS bearer to the existing MCH or assigning the MBMS bearer to a new MCH.

20 Claims, 4 Drawing Sheets

(56) References Cited

U.S. PATENT DOCUMENTS

| | | | |
|---|---|---|---|
| 2005/0282571 A1* | 12/2005 | Oprescu-Surcobe | H04W 28/10 455/503 |
| 2006/0034202 A1* | 2/2006 | Kuure et al. | 370/312 |
| 2006/0058034 A1* | 3/2006 | Vaittinen et al. | 455/450 |
| 2006/0079242 A1* | 4/2006 | Vaittinen et al. | 455/453 |
| 2006/0126556 A1* | 6/2006 | Jiang | H04L 12/18 370/328 |
| 2006/0154627 A1* | 7/2006 | Wang et al. | 455/130 |
| 2006/0268873 A1* | 11/2006 | Tonjes et al. | 370/392 |
| 2007/0064608 A1* | 3/2007 | Rinne et al. | 370/230 |
| 2007/0076715 A1* | 4/2007 | Bauer et al. | 370/390 |
| 2007/0115813 A1* | 5/2007 | Hyon et al. | 370/229 |
| 2007/0197235 A1* | 8/2007 | Zhang | 455/466 |
| 2007/0213081 A1* | 9/2007 | Zhang | 455/466 |
| 2007/0220573 A1* | 9/2007 | Chiussi et al. | 725/114 |
| 2007/0275742 A1* | 11/2007 | Zhang | H04L 12/189 455/466 |
| 2008/0043658 A1* | 2/2008 | Worrall | 370/312 |
| 2008/0045224 A1* | 2/2008 | Lu et al. | 455/446 |
| 2008/0212651 A1* | 9/2008 | Santhoff et al. | 375/130 |
| 2008/0293399 A1* | 11/2008 | Xu et al. | 455/422.1 |
| 2008/0298294 A1* | 12/2008 | Gonsa et al. | 370/312 |
| 2008/0298325 A1* | 12/2008 | Vujcic | 370/336 |
| 2009/0073911 A1* | 3/2009 | Cheon et al. | 370/312 |
| 2009/0147717 A1* | 6/2009 | Cai | 370/312 |
| 2009/0175212 A1* | 7/2009 | Rey et al. | 370/312 |
| 2009/0193481 A1* | 7/2009 | Huang | 725/109 |
| 2009/0245256 A1* | 10/2009 | Yan et al. | 370/390 |
| 2009/0253435 A1* | 10/2009 | Olofsson et al. | 455/450 |
| 2009/0254330 A1* | 10/2009 | Goria | 703/13 |
| 2009/0264130 A1* | 10/2009 | Catovic et al. | 455/436 |
| 2009/0305712 A1* | 12/2009 | Franceschini et al. | 455/450 |
| 2010/0027541 A1* | 2/2010 | Eriksson et al. | 370/390 |
| 2010/0029266 A1* | 2/2010 | van Gassel et al. | 455/424 |
| 2010/0074119 A1* | 3/2010 | Krishnaswamy | 370/242 |
| 2010/0091726 A1* | 4/2010 | Ishii et al. | 370/329 |
| 2010/0093312 A1* | 4/2010 | Roh et al. | 455/411 |
| 2010/0103852 A1* | 4/2010 | Jactat | 370/312 |
| 2010/0103854 A1* | 4/2010 | Lee et al. | 370/312 |
| 2010/0105390 A1* | 4/2010 | Ishii | 455/436 |
| 2010/0110961 A1* | 5/2010 | Chao et al. | 370/312 |
| 2010/0120420 A1* | 5/2010 | Agashe et al. | 455/432.1 |
| 2010/0142492 A1* | 6/2010 | Huschke et al. | 370/336 |
| 2010/0142517 A1* | 6/2010 | Montemurro et al. | 370/352 |
| 2010/0165902 A1* | 7/2010 | Kvernvik | H04L 12/189 370/312 |
| 2010/0167746 A1* | 7/2010 | Lee et al. | 455/450 |
| 2010/0182277 A1* | 7/2010 | Nakajima et al. | 345/174 |
| 2010/0290413 A1* | 11/2010 | Kuwahara | 370/329 |
| 2010/0315987 A1 | 12/2010 | Kuo | |
| 2010/0322133 A1* | 12/2010 | Kuo | 370/312 |
| 2010/0329172 A1* | 12/2010 | Wu et al. | 370/312 |
| 2011/0021205 A1* | 1/2011 | Horneman et al. | 455/450 |
| 2011/0188436 A1* | 8/2011 | Damnjanovic et al. | 370/312 |
| 2011/0194477 A1* | 8/2011 | Damnjanovic et al. | 370/312 |
| 2012/0008525 A1* | 1/2012 | Koskinen | 370/253 |
| 2012/0028626 A1* | 2/2012 | Marocchi et al. | 455/422.1 |
| 2012/0110120 A1* | 5/2012 | Willig et al. | 709/217 |
| 2012/0163286 A1* | 6/2012 | Huschke et al. | 370/315 |
| 2012/0202478 A1* | 8/2012 | Van Lieshout et al. | 455/419 |
| 2013/0281006 A1* | 10/2013 | Rogers et al. | 455/3.01 |

OTHER PUBLICATIONS

Wei et al., "Method and system for realizing multimedia broadcasting and multicasting service transmission channel bearing", Nov. 24, 2010, CN, CN101895820, machine translation.*

Wang, "Method, MCE and base station for dynamically dispatching wireless resources for MBSFN transmission", Apr. 11, 2010, CN, WO 2010/124411, machine translation.*

3GPP TS 23.246 V9.3.0; 3rd Generation Partnership Project; Technical Specification Group Services and Architecture; Multimedia Broadcast/Multicast Service (MBMS); Architecture and Functional Description (Release 9); December 10, 2009; pp. 30-32.

PCT International Search Report and Written Opinion for Application No. PCT/US2011/064775 mailed Mar. 26, 2012.

* cited by examiner

SYSTEM AND METHOD IN A COMMUNICATION NETWORK OF DYNAMICALLY ASSIGNING A MULTIMEDIA BROADCAST/MULTICAST SERVICE BEARER TO A MULTICAST CHANNEL

TECHNICAL FIELD

The present disclosure relates generally to communication systems and in particular to a system and method in a communication network of dynamically assigning a Multimedia Broadcast/Multicast Service (MBMS) bearer to a Multicast Channel (MCH).

BACKGROUND

Efficient, reliable, and real-time communication with minimal latency is a critical requirement for public safety organizations and first responders. As broadband cellular networks have improved, public safety organizations and first responders have begun to adopt and rely on broadband cellular networks as complementary solutions to existing narrowband networks. In particular, 3$^{rd}$ Generation Partnership Project (3GPP) Long Term Evolution (LTE), as described in the 3GPP 36-series documents, and any subsequent revisions, is emerging as the broadband solution of choice for public safety applications. In a typical scenario, legacy narrowband networks are used for voice communication while low latency, high-throughput LTE broadband networks are used to enable data-intensive multimedia communication such as video streaming and other multimedia services.

Moreover, LTE networks enable efficient data-intensive Multimedia Broadcast/Multicast Service (MBMS) over wireless networks to any number of mobile devices. Thus, mission critical images, video, or other multimedia streams can be simultaneously delivered to a plurality of emergency responders, officials, or other agencies and individuals requiring such information.

In practice, MBMS networks are statically configured by an operator in advance of use. The MBMS configuration includes, for example, defining available Multicast Channels (MCHs) (also referred to herein interchangeably as "multicast channels") along with a Quality of Service (QoS) for each of the available Multicast Channels, and a service area definition for each of the available Multicast Channels. In non-critical applications where there are little to no QoS requirements, such as stock market updates, a static MBMS configuration is acceptable. However, this is not acceptable for public safety applications where time and up-to-date information are critical. For example, in an emergency or other public safety situation, many factors can dynamically change including the target group of mobile devices, the service area definition, and QoS requirements, among others.

Accordingly, there is a need for a system and method in a communication network of dynamically assigning a MBMS bearer to a MCH.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
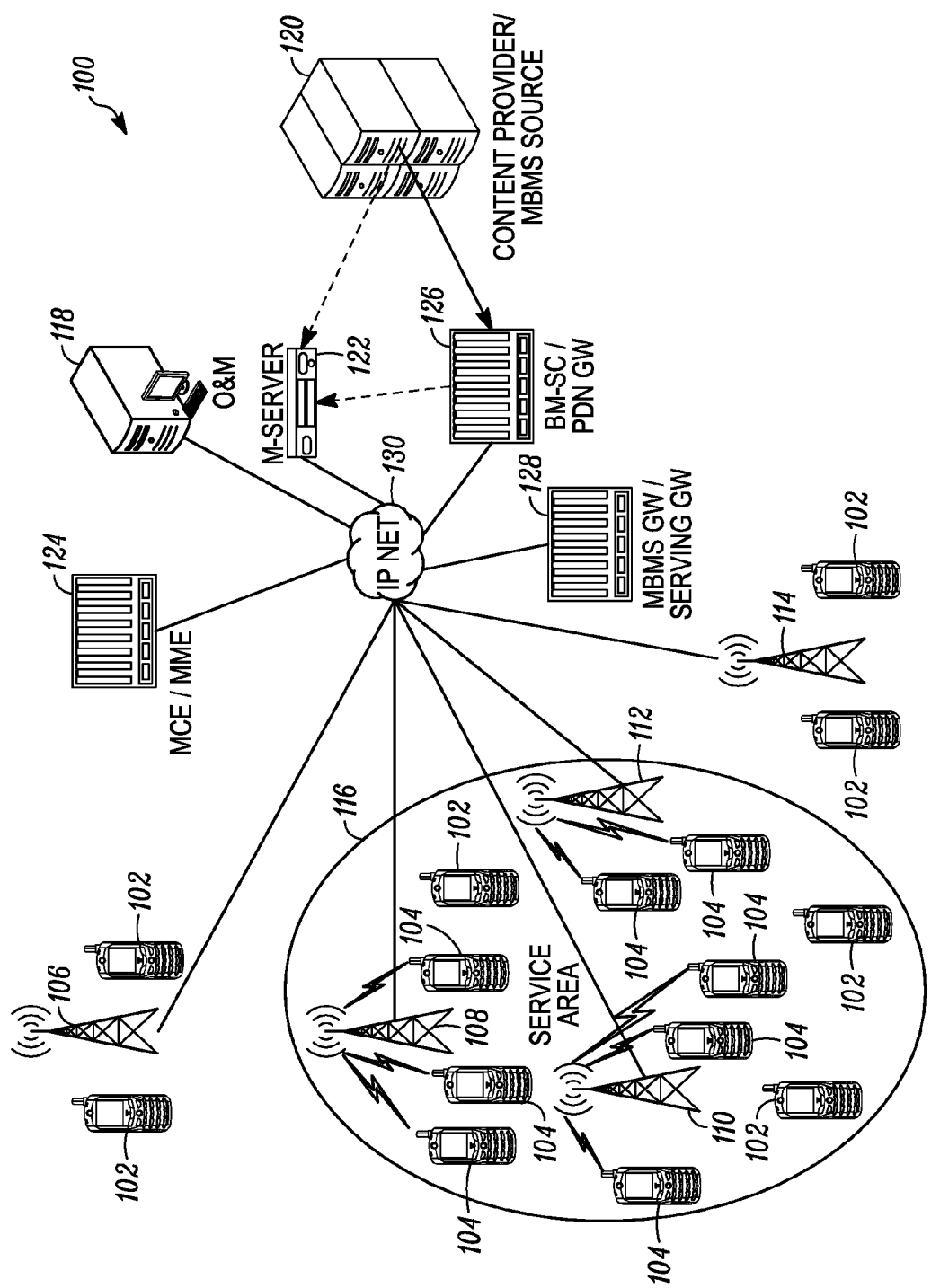
FIG. 1 illustrates a communication network in accordance with some embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method in a communication network of dynamically assigning a MBMS bearer having a specified QoS to an existing or a new MCH in a service area. The method is performed in a logical server (also referred to as an "M-Server" and a "logical server function") and includes: receiving a MBMS configuration for the communication network; receiving a request for a MBMS bearer within a service area, wherein the request specifies a QoS requirement for the MBMS bearer; inspecting the MBMS configuration to determine if an existing MCH in the service area meets the QoS requirement for the MBMS bearer; based on the inspecting, assigning the MBMS bearer to the existing MCH or assigning the MBMS bearer to a new MCH.

The term "logical server" implies that the server functionality can be employed in any suitable hardware device in the communication network including in a stand-alone device or co-located with one or more other function elements in the communication network. In at least one embodiment, various other functional elements that are also coupled to the communication network include an operations and maintenance (O&M) system, a broadcast/multicast-service center (BM-SC), a mobility management entity (MME), a MBMS coordination entity (MCE), a MBMS gateway (MBMS-GW), and a policy and charging rules function (PCRF). The logical server can be included, for instance, within one or more of these functional elements. A more detailed description of each of the above-mentioned functional elements is included below with reference to FIGS. 1 and 2.

In an embodiment, a content provider initiates a multicast session by providing the request for the MBMS bearer to the logical server. The content provider includes, for example, a public safety, government, or military organization that transmits a media stream to one or more mobile devices. The content provider submits the request for the MBMS bearer to a wireless network for transmission; and in response to submitting the request, the content provider receives an MBMS bearer identification, and transmits the media stream on a MCH as specified by the MBMS bearer identification.

In one illustrative implementation, the request for the MBMS bearer, as part of initiating the multicast session, is accomplished by a Session Initiation Protocol (SIP) method, such as a SIP INVITE method, as described, for example, in Internet Engineering Task Force (IETF) Request for Comments (RFC) 3261 published June 2002, and any subsequent revisions. In some embodiments, the specified QoS is defined by a session description protocol (SDP) within the SIP INVITE method, for example, as described in IETF RFC 4566 dated July 2006, and any subsequent revisions. Moreover, embodiments of the present disclosure advantageously utilize standard IP protocols for voice and control signaling, including SIP and Real-Time Transport Protocol (RTP), as described, for example, in IETF RFC 3550 dated July 2003, and any subsequent revisions.

Aspects of the present disclosure are described below with reference to communication over a 3GPP LTE broadband network. However, at least some of the embodiments, and their associated advantages, can be implemented and appreciated in a variety of other communication systems capable of supporting the systems and methods as described herein. For example, aspects of the present disclosure can also be implemented in a Worldwide Interoperability for Microwave Access (WiMAX) broadband network, as described in the IEEE 802.16 series of standards and any subsequent revisions.

Various embodiments of the present disclosure pertain to group calls, group multimedia sessions, or conference calls that use MBMS for a downlink user plane in an LTE network as described, for example, in 3GPP Technical Specification (TS) 23.246 v9.5.0 dated Jun. 10, 2010 (and prior or future versions), titled Multimedia Broadcast/Multicast Service (MBMS), Architecture and functional description (Release 9) and any other related 3GPP TSs, hereinafter referred to as 3GPP TS for MBMS. Thus, references to "MBMS" in the present disclosure imply at least compliance with the 3GPP TSs for MBMS. Moreover, aspects described herein pertain to initiating the allocation of an MBMS bearer (used herein interchangeably with the term "MBMS session" and the term "bearer") having a desired minimum quality of service (QoS) (also referred to herein as a "specified QoS", a "QoS requirement", a "required QoS", and a "QoS level"), and assigning the MBMS bearer to an existing or a new MCH that meets the desired minimum QoS.

As used herein, the term "MBMS" bearer is defined as a logical path in a service area of a Radio Access Network between an eNodeB and a user equipment (UE) for carrying point-to-multipoint media, wherein the MBMS bearer is identified by one or more identifiers (IDs), such as, but not limited to the combination of a Temporary Mobile Group Identifier (TGMI) and a session ID. "QoS" is defined as a level of performance or performance characteristics of a logical path within a communication network, which is characterized by one or more QoS parameters such as, for example, a latency specification, a jitter specification, a bit-rate specification, a priority level, a pre-emption capability, a pre-empting vulnerability, or a packet loss specification. As described below, the teachings herein consider QoS requirements for an MBMS bearer and QoS characteristics of MCHs to use in mapping, allocating, or assigning, an MBMS bearer to an appropriate MCH within a service area.

The dynamic assigning of a MBMS bearer to a MCH includes dynamic setting or changing of an MBMS configuration and in some instances of an MCH configuration. An MBMS configuration for a communication network is defined as a parameter that if changed enabled a new or existing MCH to meet the QoS needs of a requested MBMS bearer. An MCH configuration parameter is defined as a parameter that if changes directly impacts the QoS properties for an MCH. As described herein, the MBMS configuration includes, for example: a list of available MCHs; QoS properties or characteristics for each of the available MCH as set by one or more MCH configuration parameters such as a MCH Subframe Allocation Pattern Occasion (MSAPO); a service area specification for each of the available MCHs; etc.

Wireless communication over an LTE network, in one illustrative embodiment, is accomplished over an evolved Universal Mobile Telecommunications System (UMTS) Terrestrial Radio Access Network (e-UTRAN) air interface, as described in the 3GPP 36-series documents. UE communicate with the LTE network by way of an eNodeB (eNB). As used herein, the term "eNB" is equivalently referred to as a base station. In some aspects, content providers, such as a police or fire station transmitting a multimedia stream, communicate with the LTE network by way of an internet protocol (IP) network. In some embodiments, the IP network includes a local area network (LAN)/wide area network (WAN) Enterprise or IP Multimedia Subsystem (IMS) environment, as described in 3GPP Technical Specification (TS) 23.228, and any subsequent revisions.

Referring now to the figures, FIG. 1 shows a communication network 100 capable of supporting group calls, group multimedia sessions, or conference calls using MBMS in an LTE network. The communication network 100 provides a general depiction of a physical implementation of various aspects of the present disclosure. Specifically, FIG. 1 shows a high-level example of at least one implementation of the disclosure as described herein. As illustrated, network 100 includes network elements of: an LTE Evolved Packet Core (EPC) having a number of logical elements (including a MME 124, a MBMS GW/Serving GW 128 and a BM-SC/PDN GW 126); an access network (in this case a RAN) that includes a plurality of eNodeB (LTE base station) infrastructure devices 106, 108, 110, 112, 114 and a MCE 124; a plurality of mobile devices (also referred to in the figures as UE) 102, 104; a content provider or MBMS source 120; an O&M; and an M-Server (i.e., the logical server operating in accordance with the present teaching). The LTE core and RAN collectively make up the LTE network also known as an Evolved Packet System (EPS).

The mobile devices 102, 104 are also commonly referred to in the art as communication devices, user equipment, access devices, access terminals, mobile stations, mobile subscriber units, subscriber units, user devices, and the like.

These mobile devices can be any type of communication device such as radios, mobile phones, mobile data terminals, Personal Digital Assistants (PDAs), laptops, two-way radios, cell phones, etc.

Figure 2:
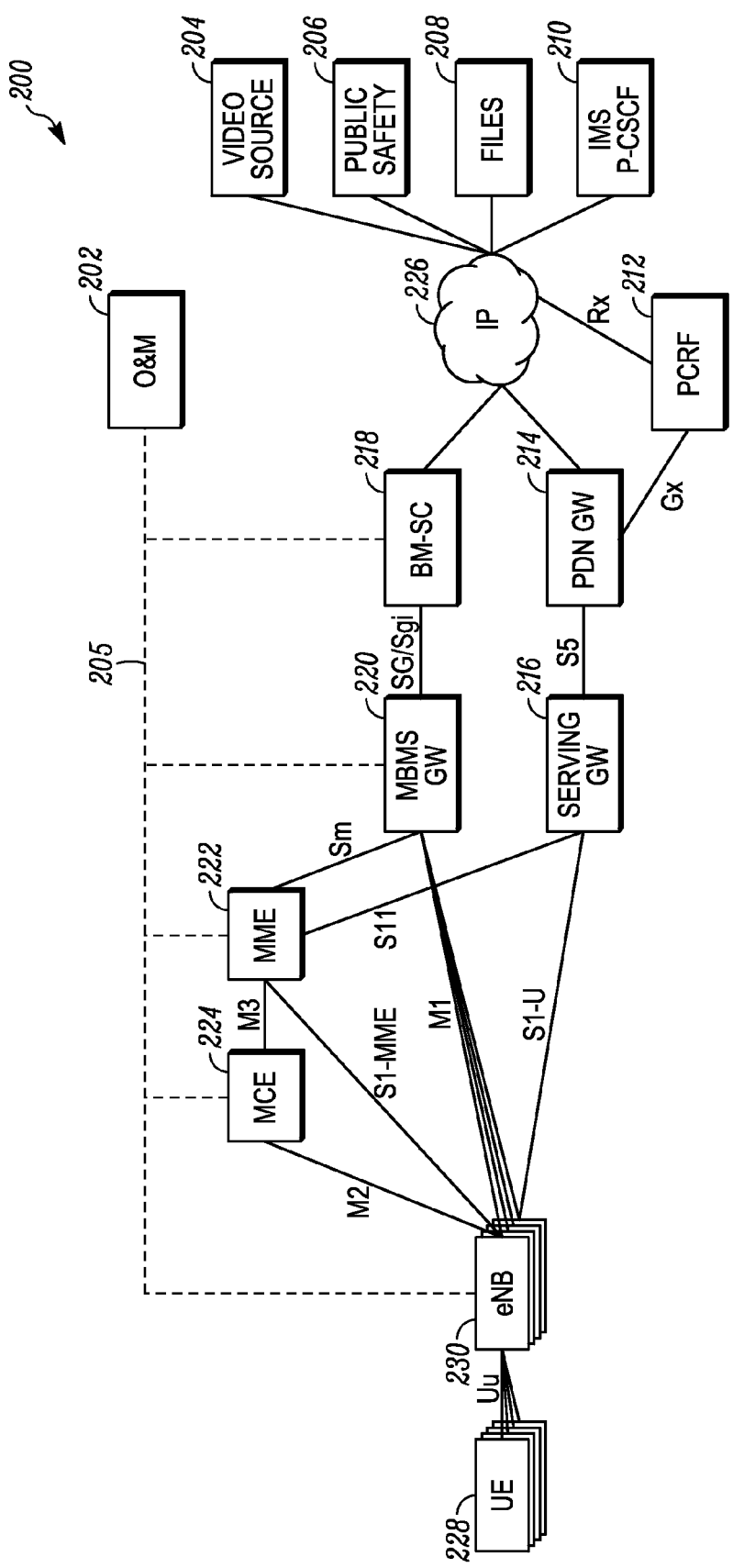
FIG. 2 illustrates a general overall architecture for a communication network capable of supporting MBMS in LTE in accordance with some embodiments of the present disclosure.
Figure 3:
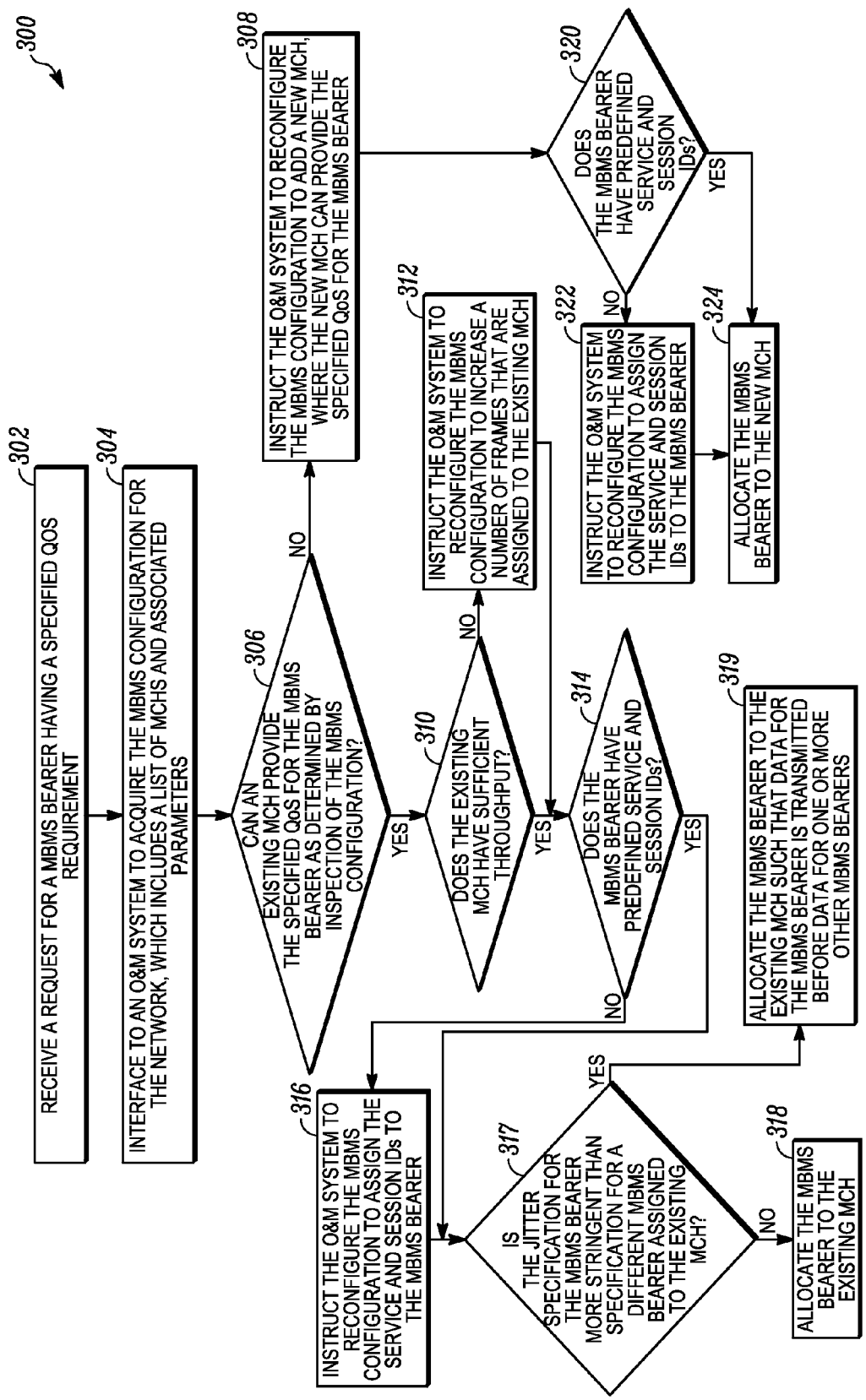
FIG. 3 is a logical flowchart, from the perspective of a logical server, showing an illustrative method in a communication network for dynamically assigning a MBMS bearer to a MCH in accordance with some embodiments of the present disclosure.
Figure 4:
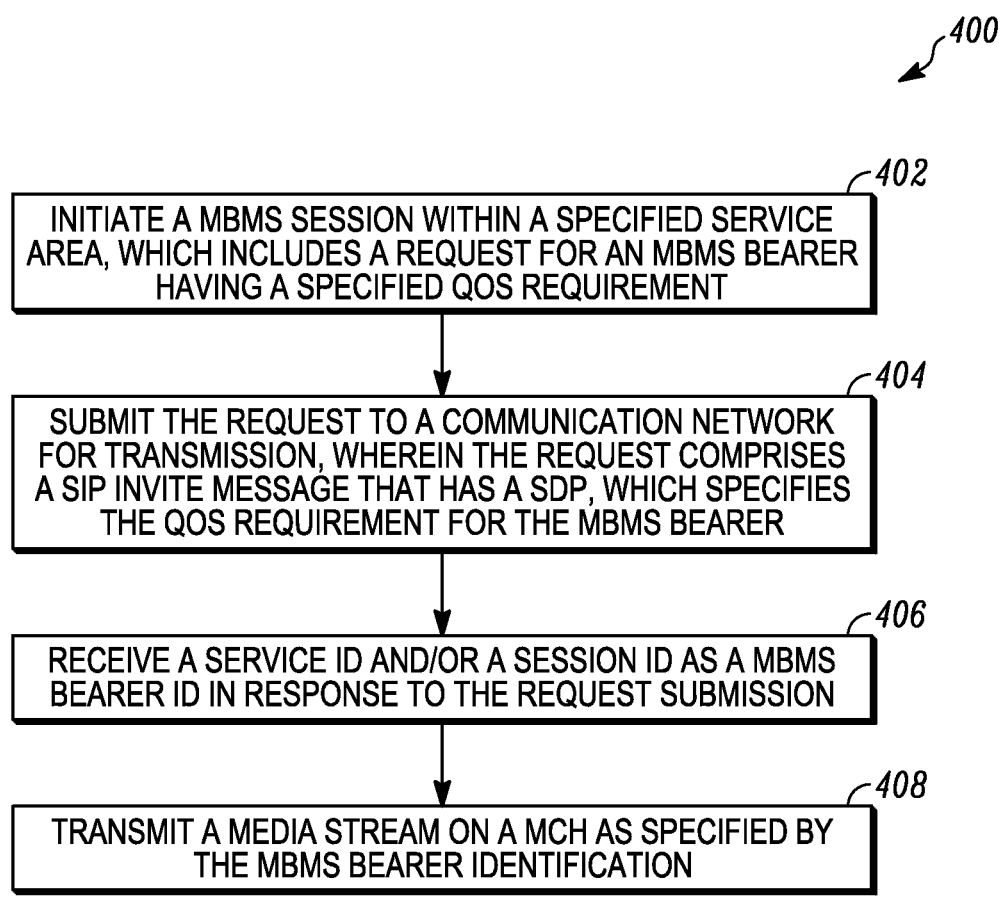
FIG. 4 is a logical flowchart, from the perspective of a content provider, showing an illustrative method in a communication network for dynamically assigning a MBMS bearer to a MCH in accordance with some embodiments of the present disclosure.

In general, the network 100 elements shown in FIG. 1 (and FIG. 2) including the EPS elements (106, 108, 110, 112, 114, 124, 126, 128), the mobile device 102, 104, the O&M 118, the content provider 120, the M-Server 122 (an all of the logical elements shown in FIG. 2 and described in detail alter) are implemented using one or more (although not shown) memory devices, network interfaces, and processing devices that are operatively coupled, and which when programmed form the means for these system elements to implement their desired functionality, for example, as illustrated by reference to the methods shown in FIGS. 3-4.

The network interfaces are used for signaling or transmitting (e.g., packets, datagrams, frames, superframes, or any other information blocks) between the network elements, for example over the IP network 130 and the RAN. The network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the elements of network 100 may be programmed with software or firmware logic or code for performing functionality described by reference to FIGS. 3-4; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a more detailed description of the functionality of the network 100 elements in accordance with the teachings herein and by reference to the remaining figures. In operation, the content provider 120 sets up a multicast session for mobile devices 104 in a specific collection of cells, for example, covered by eNBs 108, 110, and 112, and where the mobile devices 104 are in wireless communication with the eNBs 108, 110, and 112. The collection of cells is called a service area 116. In some embodiments, there are other cells outside of the service area 116, for example, cells covered by eNBs 106 and 114. Also, there can be other mobile devices 102 both inside and outside of the service area 116, which are not part of the multicast session. Alternatively, the service area 116 contains all cells in the communication network 100. A "cell" as the term is used herein means a geographic area in which radio frequency resources are allocated by an eNodeB to provide wireless coverage to UE. The geographic area of a cell can be the same as or smaller than the geographic area of the corresponding eNodeB.

The content provider 120 sets up the multicast session with the mobile devices 104 by communicating a request for a multicast session, which includes a request for a MCH, to the communication network 100 in one of a plurality of ways, as described below. The content provider 120 also specifies a set of properties for the requested multicast session including, for example, the service area 116, and the desired QoS of one or more MBMS bearers to carry media that will be distributed to the mobile devices 104 including, among other parameters, one or more of a latency specification, a jitter specification, a bit-rate specification, a packet loss specification, a maximum throughput specification, a typical throughput specification, and a priority specification.

The request for the multicast session is detected by an M-server 122 of the communication network 100, as described in further detail below. More particularly, the M-server 122 learns of the request for the set of properties for the multicast session specified by the content provider 120, for example, either directly from the content provider 120 or by way of the BM-SC 126 or a policy and charging rules function (PCRF, not shown). The M-server 122 communicates with the O&M 118, for example by way of an IP network 130, and learns an MBMS configuration of the communication network 100. In various embodiments, the M-server 122 modifies the MBMS configuration by directing the O&M 118 to configure or reconfigure various functional elements of the communication network 100 to enable the requested multicast session.

For example, the O&M 118 informs the MCE/MME 124 that a certain subset of eNBs, 108, 110, 112, support cells of the service area for the multicast session and also configures or reconfigures the MBMS configuration so that a new or existing multicast channel is available to satisfy the content provider requested QoS requirements. The functional or logical elements of the O&M 118, the MCE/MME 124, a MBMS gateway (GW)/serving GW 128, the BM-SC/packet data network (PDN) GW 126, and the content provider/MBMS source 120 are described in further detail below with reference to FIG. 2. Moreover, FIG. 1 shows the collocation of some of the functional elements, such as the MCE and the MME, the MBMS GW and the serving GW, and the BM-SC and the PDN GW. However, any of these functional elements can be implemented as one or more dedicated (stand-alone) devices, or be collocated with yet other network elements.

The multicast session involves a media stream that is transmitted from the plurality of eNBs 108, 110, 112 to the mobile devices 104, within the service area 116. Thus, for example, in a public safety scenario where the mobile devices 104 represent police, fire, military, or other first responders, and where they move through the service area 116, they continue to receive an uninterrupted media stream. In various embodiments, as public safety scenarios often dynamically change, the M-server 122 directs the O&M 118 to modify the service area 116 to include more or fewer eNBs or cells. Likewise, the M-server 122 can direct the O&M 118 to create a new multicast channel or modify an existing multicast channel according to a dynamically changing situation including, for example, dynamically changing QoS requirements. In some embodiments, as shown in FIG. 1, the M-server 122 is implemented as a stand-alone element. However, in other embodiments, the M-server 122 is implemented within one or more of the other functional elements, such as the O&M 118, the MCE/MME 124, the MBMS GW/serving GW 128, or the BM-SC/PDN GW 126.

Still referring to FIG. 1, the IP network 130 includes an IP-based RAN, a local area network (LAN)/wide area network (WAN) Enterprise or IP Multimedia Subsystem (IMS) environment, as described in 3GPP Technical Specification (TS) 23.228, and any subsequent revisions. Further, the IP network 130 features any combination of network connectivity devices such as modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices enable the IP network 130 to communicate with a global information system, an intranet, or a plurality of intranets.

FIG. 2 shows a general overall architecture for a communications network 200 capable of supporting MBMS in LTE. Communication within the LTE network occurs either over a control plane or a user plane. Control plane data includes control signaling for multicast session management and MBMS configuration, among others. User plane data includes, for example, media streams from a content provider that are multicast to one or more mobile devices, labeled as user equipment (UE) 228 in FIG. 2, over the LTE network. The UEs 228 are in communication with their respective eNBs 230 over an air interface Uu. In various embodiments, the user plane data comes from different sources, such as a video source 204, a public safety source 206, a file source 208, or an IMS proxy call session control function (IMS P-CSCF) 210, among others.

These sources may require MBMS bearers having very different latency requirements. For example, a file download from the file source 208 is tolerant of significantly more latency and jitter (e.g., approximately several hundred milliseconds) as compared to public safety group calls from the public safety source 206 that would require a comparatively lower latency and jitter (e.g., approximately less than 100 milliseconds). In current LTE deployments, multicast channels and MBMS bearer assignments are statically configured, and it is thus possible that there does not exist a multicast channel that is able to provide a QoS required for an MBMS bearer. However, in embodiments of the present disclosure, multicast channels are dynamically created and/or modified in order to provide a multicast channel able to support the QoS required for the MBMS bearer.

Control and user plane data is transmitted to a BM-SC 218 via an IP network 226. In some embodiments, a multicast session is initiated by way of a SIP INVITE message transmitted to the BM-SC 218. Optionally, when the multicast session is initiated, information from the SIP INVITE may be made available to a PCRF 212 using an Rx interface. The multicast session request includes a request for one or more dedicated MBMS bearers, and the request also includes QoS specifications for the MBMS bearers. The QoS specifications are derived, in some aspects, from session description protocol (SDP) information within the SIP INVITE message.

Generally, the BM-SC 218 serves as a point-of-entry for content providers and is responsible for MBMS session announcement. Control and user data arriving at the BM-SC 218 is forwarded to the MBMS gateway (MBMS GW) 220 using an SG interface and an Sgi interface. The SG interface is used for control signaling, including MBMS session initialization as well as various other control signaling. The Sgi interface is used for the MBMS traffic plane, including transmitting media content from the content providers. Among other functions, an MBMS GW 220 multicasts media content to all eNBs 230 within a defined service area over an M1 interface. The M1 interface, as described in the 3GPP 36-series documents, is the user plane interface between the MBMS GW 220 and the eNBs 230. Communication over the M1 interface is accomplished by IP multicast. A synchronization (SYNC) protocol, as described in 3GPP TS 25.446 and any subsequent revisions, is used over the M1 interface for MBMS content synchronization.

Control plane data arriving at the MBMS GW 220 is forwarded to the eNBs 230 by way of an MME 222 and an MCE 224. Communication between the MBMS GW 220 and the MME 222 is over an Sm interface. An M3 interface is used between the MME 222 and the MCE 224, and an M2 interface couples the MCE 224 to the eNBs 230. The MME 222 is a control node involved in the MBMS bearer activation/deactivation process. The MME 222 is also responsible for security and authentication, among others. The MCE 224 is responsible for allocating time and frequency resources for the MBMS session. In some embodiments, the MCE 224 is integrated within the eNBs 230, with the M2 interface existing within the eNBs 230. The M2 interface is used to transmit radio configuration data and MBMS session control signaling. In various embodiments, Stream Control Transmission Protocol (SCTP), as described in IETF RFC 4960 dated September 2007, and any subsequent revisions, is used for signaling transport over the M2 interface. The M3 interface is used for MBMS session control signaling, including for example, MBMS session initiation/termination. SCTP is also used for signaling transport over the M3 interface.

MCH configuration information is provided to the MCE 224 by an operations and maintenance (O&M) system 202. The MCE 224, in turn, forwards the MCH configuration to the eNBs 230. Conceptually, as shown by a dashed line 205, the O&M 202 is coupled to each of the BM-SC 218, the MBMS GW 220, the MME 222, the MCE 224, and the eNBs 230. Thus, the O&M 202 can configure an MBMS configuration of the communications network 200 in order to dynamically create and/or modify a multicast channel in order to provide the QoS required for the MBMS bearer, as based on the request for a multicast session received from at least one of the content providers. In embodiments of the present disclosure, the O&M 202 is directed by an M-server, described above, to perform the necessary reconfiguration of the MBMS configuration. In some embodiments, the M-server is implemented within the BM-SC 218. Alternatively, the M-server is implemented within the MME 222. In other embodiments, the M-server is implemented within the MBMS GW 220, the MCE 224, the O&M 202, or the PCRF 212.

In addition to optionally initiating the multicast session by way of the PCRF 212, the LTE specifications detail how the PCRF 212 uses a Gx interface to instruct a PDN GW 214 to create unicast bearers. Similarly, the servers in the communications network 200 can modify the QoS of a dedicated unicast bearer or terminate the bearer. Unicast sessions can be used in the setup of an MBMS session, for example, to notify the UEs 228 that a multicast session is forthcoming and to identify the MBMS bearer. The setup of a unicast session can be accomplished very quickly, for example, in less than 1 second. In some embodiments, the PDN GW 214 is responsible for allocation of UE 228 IP addresses. The PDN GW 214 communicates with a Serving GW 216 over an S5 interface. The S5 interface provides for user plane tunneling as well tunnel management between the Serving GW 216 and the PDN GW 214. Routing and forwarding of unicast IP packets between the Serving GW 216 and the eNBs is over an S1-U interface. An S11 interface serves as a reference point between the Serving GW 216 and the MME 222, and an S1-MME interface that serves as the reference point between the MME 222 and the eNB 230.

The embodiments described above with reference to FIGS. 1 and 2 are aimed at communication networks capable of supporting MBMS in LTE. More specifically, the embodiments as described herein are directed toward the dynamic creation and/or modification of MCHs, for example by an O&M system as directed by the M-server, in order to provide a MCH that is able to deliver a required QoS for an MBMS bearer. With the above background, it is useful to now provide a more detailed discussion of QoS within MBMS, including various sources of latency and jitter encountered within MBMS.

MBMS data are transmitted over the air interface (Uu) via one or more MCHs. A MCH carries a multicast traffic channel (MTCH) and a multicast control channel (MCCH). A MCH uses a preconfigured repeating pattern of LTE sub-frames. The pattern is called a MCH sub-frame allocation pattern (MSAP). Different MCHs typically use different patterns.

MBMS uses the term "service" to describe the equivalent of a SIP session. In some aspects, a service uses a number of bearers with different QoS requirements, and does not always transmit data. In some embodiments, the presence of the bearers is started and/or stopped. In LTE a service is identified by a service identifier which takes the form of a TMGI. MBMS uses the term "session" to describe the equivalent of a, for example one, user plane IP bearer. As described herein, the terms "bearer" and "MBMS session" are used interchangeably. A session is assigned to a specific MCH and inherits the QoS properties of that traffic channel. A traffic channel supports multiple sessions that optionally belong to different services. In LTE, a session (or MBMS bearer) is identified by the combination of a TMGI and a Session ID.

As mentioned above, an eNB transmits multicast user plane on a MCH in a set of consecutive sub-frames that belong to an allocation pattern that is specific for that MCH. The set of sub-frames is called a MSAPO, which is considered part of the MCH configuration or configuration information. The MSAPO has a preconfigured length, that is, repetition period. The MSAP Occasions repeat on the MCH. Data for different sessions can be sent in the same MSAPO. The first sub-frame of the MSAPO contains a media access control (MAC)-layer scheduling element, called the dynamic scheduling indication (DS I) that indicates which sub-frames contain data for which session, as described in 3GPP TS36.300, section 15.3.3. Session data is always stacked as early as possible into the sub-frames of the MSAPO. The order of the data for the sessions is predetermined and is communicated to the UEs via the MCCH. This scheme allows the interested UEs to inspect the DSI and save battery until the data for its session appears.

What is important for the QoS of a session is that the session data be available at the eNB at the time that the eNB constructs the DSI MAC scheduling element for the MSAPO. This introduces latency. For example, data that is to be transmitted toward the end of the MSAPO waits at the eNB until all other data for that MSAPO has been sent. If the data for the preceding sessions is of variable length, this also introduces jitter. Furthermore, data for a session that arrives at the eNB during a MSAPO cannot be transmitted until the next MSAPO is configured, which can occur during a very large time frame, for example from approximately 80 milliseconds to approximately 10 seconds.

While the MSAPOs cause a granularity in the times at which session data can be transmitted from an eNB, there is a second mechanism that introduces additional latency and jitter. This mechanism is the SYNC protocol, described above. The SYNC protocol is used by the BM-SC outside an LTE core to coordinate the transmission of session data at the eNB. The SYNC protocol defines so-called "sync periods" at the eNBs. These sync periods repeat indefinitely at the BM-SC and have a precisely defined start time. The duration and timing are configured at the BM-SC. Each MCH radio access bearer has its own sync period definition. The MBMS assigns each downlink multicast packet to a specific sync period, where one period can contain more than one packet. The MBMS should not assign a packet to a period if it cannot reasonably assume that the packet reaches the target eNBs in time to be transmitted. The MBMS should account for network delays and for the above-mentioned MSAPO delay. In some embodiments, a safety factor is configured into the BM-SC.

Some of the QoS parameters for a multicast bearer are communicated to the radio access network (RAN) by the content provider, via the BM-SC, at the start of the session. These parameters are present in the SESSION START REQUEST message, as described in 3GPP TS36.443 and TS36.444. Examples of such parameters include a QoS class identifier (QCI), a priority level, a pre-emption capability, a pre-empting vulnerability, a maximum bit rate, and a guaranteed bit rate, among others as described above.

Many bearer properties that impact the QoS of a MBMS bearer are inherited from the parameters of the MCH on which the bearer is transmitted. In current implementations these parameters are configured by the LTE O&M system. In LTE this information is configured into the MCE, which communicates it to the eNBs in the RAN via the M2 interface. In UMTS, it is configured at a radio network controller (RNC). The most important MCH parameters are the duration and the timing of the MSAPOs and the assignment of the various service and session IDs to the available MCHs. Thus, when the BM-SC signals the start of a session, the service ID and the session ID predetermine the MCH on which the bearer data is transmitted, which in turn determines the latency and the jitter.

Therefore, as described herein in accordance with the various embodiments of the present disclosure, a logical server, such as the M-Server described above, dynamically selects the latency and jitter for a new MBMS session or dynamically modifies the latency and jitter for an existing MBMS session. In one aspect, the logical server receives information about the QoS requirements, including latency and jitter, for a MBMS bearer. Moreover, the logical server responsively initiates allocation of a bearer that is mapped or assigned to a MCH that meets the specified QoS requirements. In some embodiments, the configuration of an existing MCH is modified to meet the specified QoS requirements. Alternatively, the logical server sets up a new MCH that meets the specified QoS requirements.

If necessary, the logical server provides a new or modified service area specification that defines the area in which the MBMS bearer is to be transmitted. A service area specification defines one or more of: a list of cells; a list of eNBs 230; a list of downlink MCE 224 nodes to which the MME 222 forwards control information regarding the bearer; a corresponding list of downlink MME 222 nodes for the MBMS GW 220; or a list of downlink MBMS GW 220 nodes for the BM-SC 218. In this way, the logical, thereby, reconfigures the MCE and/or eNBs in the specified service area to ensure that the multicast session is mapped to an appropriate MCH.

Referring now to FIG. 3, a logical flowchart 300, from the perspective of the M-server, illustrates a method in a communication network for dynamically assigning a MBMS bearer having a specified QoS to a MCH, in accordance with various embodiments of the present disclosure. Accordingly, at 302, the M-server receives a request for a MBMS bearer having a specified minimum QoS requirement. The QoS requirement is specified by one or more of the following QoS parameters including, but not limited to, a latency specification, a jitter specification, a bit-rate specification, a packet loss specification, etc.

The M-server learns the QoS specification in at least one of a plurality of ways. For example, a PCRF learns the QoS requirements using known interfaces and protocols, such as the Rx interface. Alternatively, a public safety gateway, a BM-SC, or an MBMS gateway learns the QoS requirements from the SDP protocol in SIP messages and communicates the requirements to the M-server. In other embodiments, the M-server learns which codec is used on the MBMS bearer and derives the QoS requirements from the codec. Optionally, the communication network uses specific QCI values to communicate the latency requirements of a session, and the M-server derives the latency and jitter requirements from the QCI value. Such an embodiment would work well, for example, when the M-server is implemented in a network element that is in the MBMS control path, such as the MME or MCE. Illustratively, various embodiments of the present disclosure, as described herein, can be triggered by the reception of the SESSION START REQUEST message or a session modify request for the MBMS bearer.

The M-server has access to the MBMS configuration, i.e., the MBMS parameters that are configured in the RAN, including the configuration of the MCE, the eNBs, the RNC, the MME, the MBMS GW, and the BM-SC, among others. The MBMS parameters include a list of available MCHs, MSAPO parameters, and a list of service IDs and session IDs assigned to each MCH, possibly together with service area information. At 304, the M-server interfaces with an O&M system to acquire this information regarding the MBMS configuration. In some embodiments, the M-server queries the O&M for the MBMS configuration information. Optionally, for example when the M-server is implemented within the MCE, the M-server has direct access to the MBMS configuration parameters because the MBMS configuration data is provisioned into the MCE, and thus into the M-server.

At 306, the M-server inspects the MBMS configuration to determine if an existing MCH can provide the specified QoS for the MBMS bearer. For example, the M-server compares the MSAPO period of the MCH with the latency as specified in the QoS requirements for the MBMS bearer. If there is not an existing MCH that can provide the specified QoS for the MBMS bearer, the M-server instructs the O&M to reconfigure the MBMS, as described below, to add a new MCH that is able to provide the specified QoS for the MBMS bearer (at 308). For example, the M-server adds an MCH with the proper MSAPO period to the MBMS configuration. The M-server determines, at 320, whether the MBMS bearer has pre-defined service and session IDs. If not, at 322, the M-server instructs the O&M to reconfigure the MBMS to assign service and session IDs, such as a TMGI and a session ID, to the MBMS bearer. The assigned TMGI and/or session ID are communicated to the UEs, for example using SDP or extensible markup language (XML) information that is unicast or multicast to the UEs. The MBMS bearer is allocated (assigned) to the new MCH, at 324. If the M-server determines, at 320, that the MBMS bearer does have pre-defined service and session IDs, the MBMS bearer is allocated to the new MCH, at 324.

If the M-server determines, at 306, that there is an existing MCH that can provide the specified QoS for the MBMS bearer, the M-server checks whether the existing MCH has sufficient throughput, at 310. In various embodiments, the M-server also checks whether the MCH already carries so much traffic from existing bearers that the new MBMS bearer cannot be safely added. If so, and depending on the priority and pre-emption characteristics of the new and existing MBMS bearers, the M-server may stop some of the existing MBMS bearers. Optionally, the M-server may also modify the MBMS configuration such that the existing MBMS bearers with lower priority move to the end of the MSAPO, so that they can drop off the end of the MSAPO under overload conditions.

If the existing MCH does not have sufficient throughput, the M-server instructs the O&M to reconfigure the MBMS, for example to increase the number of frames and/or sub-frames that are assigned to the existing MCH (at 312). In some embodiments, the start times are adjusted such that the packets arrive at the eNBs just before the start of the MSAPO. The M-server determines, at 314, whether the MBMS bearer has pre-defined service and session IDs. Optionally, if at 310 the M-server determines that the existing MCH does have sufficient throughput, the M-server may also determine, at 314, whether the MBMS bearer has pre-defined service and session IDs. If, at 314, the M-server determines that the MBMS bearer does not have pre-defined service and session IDs, the M-server instructs the O&M to reconfigure the MBMS configuration to assign service and session IDs to the MBMS bearer (at 316).

The M-server determines, at 317, if the jitter specification for the MBMS bearer is more stringent than a jitter specification for one or more other MBMS bearers that are assigned to the existing MCH. If so, at 319, the M-server allocates the MBMS bearer to the existing MCH such that data for the MBMS bearer is transmitted before data for at least some of the other MBMS bearers assigned to the MCH. For example, the M-server instructs the O&M to reconfigure the MBMS configuration such that the service and session IDs for the MBMS bearer appear early in the list of services provided on the MCH, so that the data for the MBMS bearer is inserted early in the MSAPOs and is transmitted before the data for the selected other MBMS bearers assigned to the MCH. In general, this avoids the impact of fluctuations in the amount of data for the other MBMS bearers on the transmission of the data for the new MBMS bearer, thus reducing the jitter of the new MBMS bearer. For further enhanced performance, the M-server optionally adjusts the start times of the MSAPO and the SYNC cycles such that the packets for the new bearer arrive at the eNBs just before the MSAPO starts.

If, at 317, the M-server determines that the jitter specification for the MBMS bearer is not more stringent than the jitter specification for other MBMS bearers that are assigned to the existing MCH, the MBMS bearer is allocated to the existing MCH (at 318). Returning to 314, if the M-server determines that the MBMS bearer does have pre-defined service and session IDs, the M-server determines, at 317, if the jitter specification for the MBMS bearer is more stringent than the jitter specification for other MBMS bearers that are assigned to the existing MCH. The M-server responds to such determination as described above.

In various embodiments, reconfiguration of the MBMS configuration depends on the implementation of the M-server. For example, if the M-server is not implemented within the MCE, the M-server interfaces to the O&M and instructs the O&M to change the MBMS configuration, as described above. The O&M responsively reconfigures the MCE, among others. The M-server interface to the O&M system is similar to an interface used by remote operators or remote configuration agents. However, in embodiments of the present disclosure, the M-server dynamically instructs the O&M to change the MBMS configuration without human or other external intervention, but rather automatically and dynamically in accordance with the embodiments described herein. In some embodiments, the M-server communicates directly with one or more MCEs in the service area to communicate the new configuration. Optionally, the MCE stores a desired configuration and the M-server instructs the MCE, either directly or via the O&M, when to implement the stored configuration. If the M-server is implemented within the MCE, the MCE already knows the desired configuration, and the MCE updates the O&M with the new configuration.

The MCE pushes the new configuration to the affected eNBs in the service area. For example, the MCE uses a standard functionality, such as a MCE CONFIGURATION UPDATE and/or and MBMS SCHEDULING INFORMATION REQUEST, as described in 3GPP TS36.443, Section 8. In parallel, or at a later time, the M-server sends the SESSION START REQUEST message for the new MBMS bearer. This establishes the user data path over the Ml interface.

The eNBs inform the interested UEs that the MBMS configuration is changing, for example, by changing the information on the multicast control channel (MCCH) or on the broadcast control channel (BCCH). The UEs receive the new configuration and session information, and UEs interested in the service start to decode the MCH and pick up any user data for the new MBMS bearer. Interested UEs, in one example, include a predetermined group of fire, police, or other first responders receiving a multicast media stream from a public safety content provider.

Embodiments of the present disclosure, as described herein, can be implemented, for example, within the BM-SC without modification of the 3GPP specifications. As such, the BM-SC should closely interact with the O&M. In various embodiments, the BM-SC also interfaces with the O&M, as described above, to determine the correct sync period length for the SYNC protocol and to determine a list of downstream MBMS GWs and MMEs.

FIG. 4 shows a logical flowchart 400, from the perspective of the content provider, that illustrates a method in a communication network for dynamically assigning a MBMS bearer having a specified QoS to a MCH, in accordance with various embodiments of the present disclosure. The content provider includes, for example, a public safety, government, or military organization that transmits a media stream to one or more mobile devices. Accordingly, at 402, the content provider initiates a MBMS session within a specified service area. Initiation of the MBMS session includes a request for an MBMS bearer having a specified QoS. The request for the MBMS bearer is submitted to a communication network for transmission, at 404, and comprises a SIP INVITE message having a SDP that transmits the specification for the QoS of the MBMS bearer. In some embodiments, the communication network includes an LTE network. However, at least some embodiments can be implemented in a variety of other communication systems and networks capable of supporting the systems and methods as described herein. As described above and as shown in FIG. 3, in at least one implementation an M-server in the communication network receives (302) the request for the MBMS bearer having the specified minimum QoS requirement. In response to the reception of the request, the M-server may instruct the O&M system of the network to reconfigure the MBMS configuration of the network to allocate (318) the MBMS bearer to an existing MCH and to assign (316) service and/or session identification (ID) to the requested MBMS bearer. Alternatively, the M-server may instruct the O&M system of the network to reconfigure the MBMS configuration to add (308) a new MCH and to assign (322) service and/or session ID to the MBMS bearer corresponding to the new MCH.

At 406, the content provider receives a MBMS bearer ID in response to the request for the MBMS bearer. The MBMS bearer ID includes a service ID, a session ID or both. A media stream, from the content provider, is transmitted on a multicast channel (at 408), as specified by the MBMS bearer ID.

In the foregoing specification, specific embodiments have been described. However, one of ordinary skill in the art appreciates that various modifications and changes can be made without departing from the scope of the invention as set forth in the claims below. For example, since multicast in LTE and UMTS is very similar, embodiments of the present disclosure can also be implemented within UMTS network elements, such as a BM-SC, a Gateway General Packet Radio Service Support Node (GGSN), a Serving General Packet Radio Service Support Node (SGSN), and an RNC, among others. Moreover, embodiments of the present disclosure may also be implemented within other broadband technologies, such as WiMAX. In a WiMAX communication network, the role of the eNB is taken by a WiMAX base station or Access Point, and the role of the MME/MCE is taken by an Access Services Network Gateway (ASN-GW). Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for dynamically assigning a multimedia broadcast/multicast service (MBMS) bearer to a Multicast Channel (MCH) in a communication network, the method comprising:
   at a logical server:
   receiving a MBMS configuration for the communication network;
   receiving, from a content provider, a request for a MBMS bearer within a service area, wherein the request specifies a QoS requirement for the MBMS bearer;
   inspecting the MBMS configuration to determine if an existing MCH in the service area meets the QoS requirement for the MBMS bearer;
   based on the inspecting, assigning the MBMS bearer to the existing MCH or assigning the MBMS bearer to a new MCH.

2. The method of claim 1, wherein assigning the MBMS bearer to the existing MCH comprises:
   determining that the existing MCH meets the QoS requirement for the MBMS bearer;
   determining that the existing MCH has sufficient bandwidth to support the MBMS bearer; and
   assigning the MBMS bearer to the existing MCH.

3. The method of claim 1, wherein assigning the MBMS bearer to the existing MCH comprises:
   determining that the existing MCH meets the QoS requirement for the MBMS bearer;
   determining that the existing MCH lacks sufficient bandwidth to support the MBMS bearer;
   reconfiguring the MBMS configuration to increase a number of frames that are assigned to the existing MCH; and
   assigning the MBMS bearer to the existing MCH.

4. The method of claim 1, wherein assigning the MBMS bearer to a new MCH comprises:
   determining at least one of: an inability of the existing MCH to meet the QoS requirement for the MBMS bearer; or an insufficient bandwidth of the existing MCH to support the MBMS bearer;
   reconfiguring the MBMS configuration to add the new MCH, wherein the new MCH meets the QoS requirement for the MBMS bearer; and
   assigning the MBMS bearer to the new MCH.

5. The method of claim 1, wherein the QoS requirement includes at least one of a latency specification and a jitter specification.

6. The method of claim 1 further comprising:
   inspecting the MBMS configuration to determine if the existing MCH covers the service area for the MBMS bearer;
   determining that the existing MCH does not cover the service area for the MBMS bearer; and
   assigning the MBMS bearer to the new MCH.

7. The method of claim 1, wherein Session Description Protocol is used to specify the QoS requirement for the MBMS bearer.

8. The method of claim 1 further comprising:
   interfacing to an operations and maintenance (O&M) system; and
   receiving, from the O&M system, the MBMS configuration, wherein the MBMS configuration includes a list of available multicast channels, wherein the list provides a QoS specification for each of the available multicast channels, and wherein the list provides a service area specification for each of the available multicast channels.

9. The method of claim 1, wherein assigning the MBMS bearer to the existing MCH comprises:
   determining that a jitter specification for the requested MBMS bearer is more stringent than a jitter specification for another MBMS bearer assigned to the existing MCH; and
   in response to the determining that the jitter specification for the requested MBMS bearer is more stringent than the jitter specification for the other MBMS bearer, assigning the requested MBMS bearer to the existing MCH such that data for the requested MBMS bearer is transmitted before data for the other MBMS bearer.

10. The method of claim 1, wherein assigning the MBMS bearer comprises:
   interfacing to an operations and maintenance (O&M) system; and
   instructing the O&M system to reconfigure the MBMS configuration.

11. The method of claim 1, assigning the MBMS bearer comprises:
   interfacing to a radio access network (RAN) element; and
   instructing the RAN element to reconfigure the MBMS configuration.

12. The method of claim 1, wherein at least one base station within the service area is reconfigured to transmit the MBMS bearer on the existing MCH or the new MCH.

13. The method of claim 12, wherein the MBMS bearer uses a service identification (ID) and a session ID, and wherein the at least one base station within the service area is reconfigured to transmit the service ID and the session ID over a multicast control channel for the existing MCH or the new MCH.

14. The method of claim 1, wherein assigning the MBMS bearer to the existing MCH comprises:
   determining that the existing MCH meets the QoS requirement for the MBMS bearer;
   determining that the existing MCH lacks sufficient bandwidth to support the MBMS bearer; and
   modifying the MBMS configuration such that existing MBMS bearers of lower priority are moved to a later position in a set of sub-frames than new or existing MBMS bearers of higher priority; and
   assigning the MBMS bearer to the existing MCH.

15. A method for dynamically allocating a multimedia broadcast/multicast service (MBMS) bearer having a QoS in a communication network including an MBMS configuration, the method comprising:
   at a content provider:
   initiating a MBMS session within a specified service area including a request for the MBMS bearer, the request comprising a specification for the QoS of the MBMS bearer;
   submitting the request to a logical server of a communication network for transmission, the submitting resulting in a change to the MBMS configuration and wherein the change in the MBMS configuration comprises a modification of an existing Multicast Channel (MCH) to meet the specification for the QoS of the MBMS bearer or a setting up of a new MCH that meets the specification for the QoS of the MBMS bearer;
   in response to the submitting, receiving an MBMS bearer identification corresponding to the changed MBMS configuration; and
   transmitting a media stream on a MCH as specified by the MBMS bearer identification.

16. The method of claim 15, wherein the request comprises a session initiation protocol (SIP) INVITE method.

17. The method of claim 16, wherein the SIP INVITE method includes a SDP that is used to transmit the specification for the QoS of the MBMS bearer.

18. The method of claim 15, wherein the MBMS bearer identification includes at least one selected from the group consisting of: a service ID; and a session ID.

19. A system for assigning a multimedia broadcast/multicast service (MBMS) bearer to a Multicast Channel (MCH) in a communication network, the system comprising:
   a logical server having a processing device, network interface, and memory coupled together to:
   receive a MBMS configuration for the communication network;
   receive, from a content provider, a request for a MBMS bearer within a service area, wherein the request specifies a QoS requirement for the MBMS bearer;
   inspect the MBMS configuration to determine if an existing MCH in the service area meets the QoS requirement for the MBMS bearer;
   based on the inspecting, assign the MBMS bearer to the existing MCH or assigning the MBMS bearer to a new MCH.

20. The system of claim 19 further comprising:
   an operations and maintenance (O&M) system coupled to the network;
   wherein the O&M system transmits the MBMS configuration to the logical server; and
   wherein the logical server instructs the O&M system to reconfigure the MBMS configuration.

* * * * *